US005413096A

United States Patent [19]

Hart

[11] Patent Number: 5,413,096

[45] Date of Patent: May 9, 1995

[54] REGULATOR WITH IMPROVED HIGH PRESSURE SEAT DUE TO A PLASTIC-COVERED VALVE BODY

[75] Inventor: Dennis L. Hart, Newport Beach, Calif.

[73] Assignee: U. S. Divers Co., Inc., Santa Ana, Calif.

[21] Appl. No.: 76,814

[22] Filed: Mar. 23, 1993

Related U.S. Application Data

[63] Continuation of Ser. No. 724,371, Jun. 28, 1991.

[51] Int. Cl.$^6$ .......................... A62B 9/02; A62B 18/02; F16L 7/00; F16K 31/12

[52] U.S. Cl. .......................... 128/205.24; 128/201.28; 137/375; 137/505.42; 251/357; 251/358

[58] Field of Search ...................... 128/201.28, 204.18, 128/204.26, 205.24; 137/375, 505.42; 251/356–358, 368

[56] References Cited

U.S. PATENT DOCUMENTS

| | | | |
|---|---|---|---|
| 3,318,567 | 5/1967 | Gifford | 128/205.24 |
| 3,495,607 | 2/1970 | Shugarman . | |
| 3,537,683 | 11/1970 | Snell, Jr. | 128/205.24 |
| 3,738,383 | 6/1973 | David | 128/205.24 |
| 3,904,173 | 9/1975 | Taylor | 128/205.24 |
| 3,958,595 | 5/1976 | Al et al. | 128/205.24 |
| 3,990,675 | 11/1976 | Bonafous | 128/205.24 |
| 4,237,917 | 12/1980 | Merrifield . | |

FOREIGN PATENT DOCUMENTS

| | | |
|---|---|---|
| 1039202 | 8/1966 | United Kingdom . |
| 1308648 | 2/1973 | United Kingdom . |

*Primary Examiner*—Kimberly L. Asher
*Attorney, Agent, or Firm*—George F. Bethel; Patience K. Bethel

[57] ABSTRACT

The invention disclosed herein comprises a self-contained breathing apparatus regulator having a valve seat for overlying the crown of an orifice wherein high pressure gas is regulated by said valve seat into said orifice. The valve seat has a valve seat body of an inverted T shaped configuration. The upright portion of the T shaped configuration is seated within a spring block assembly having a seal around said upright portion. A continuous plastic coating is provided around the valve seat body into the zone of said orifice and beyond the zone of said seal so as to expose the junction only to intermediate pressure to prevent delamination of the plastic from the valve seat body.

13 Claims, 2 Drawing Sheets

Fig. 1
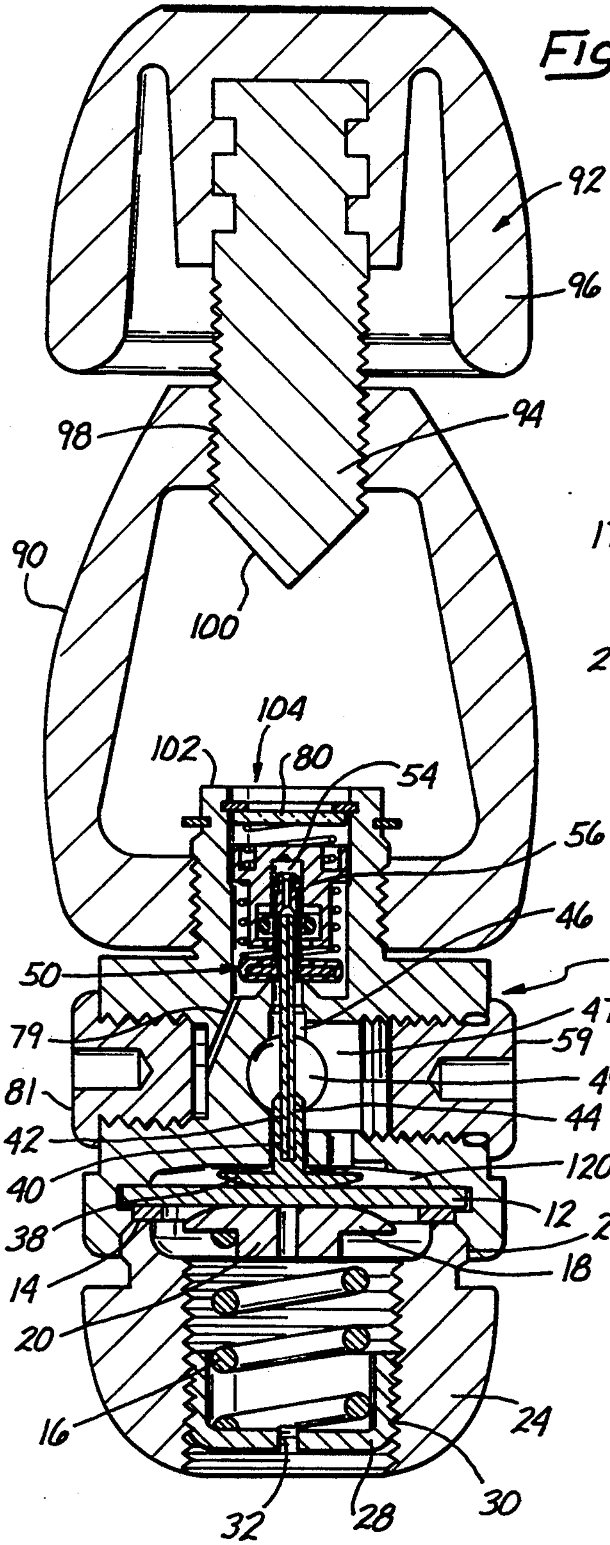
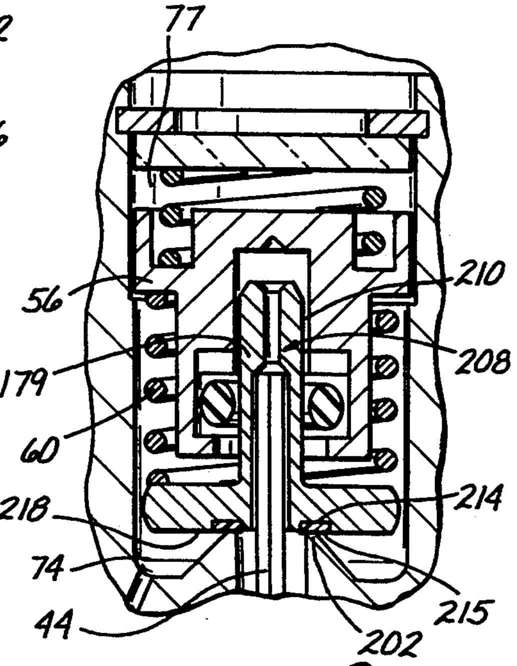
Fig. 2
PRIOR ART
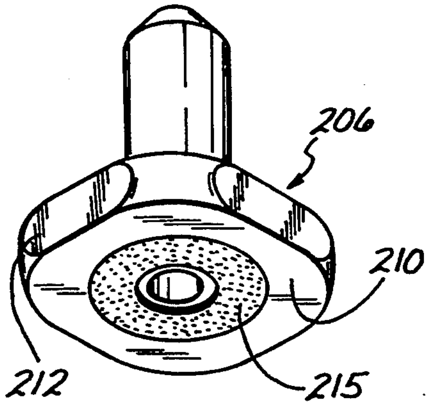
Fig. 3
PRIOR ART

REGULATOR WITH IMPROVED HIGH PRESSURE SEAT DUE TO A PLASTIC-COVERED VALVE BODY

This application is a continuation of application Ser. No. 07/724,371, filed Jun. 28, 1991, pending.

FIELD OF THE INVENTION

The field of this invention lies within the art of regulating gas. More specifically, it lies within the art of regulating breathing gas that is used by a person breathing from self-contained breathing apparatus. Self-contained breathing apparatus usually comprises a first stage or high pressure regulator and a second stage or demand regulator. The invention hereof relates to the high pressure or first stage regulator and valving of gas from the high pressure to an intermediate pressure for demand usage.

BACKGROUND OF THE INVENTION

The regulation of breathing gas by high pressure regulators is common to that required to regulate the flow of gas from a high pressure to an intermediate source. Such regulators are known in self-contained breathing apparatus. Generally, the first stage or high pressure regulator regulates upwards of 3,500 psi gas to an intermediate or lower pressure. The regulation can be from the high pressure source of 3,500 psi down to approximately 120 to 140 psi.

After the first stage regulation of the high pressure gas, a demand or second stage regulator can be utilized for a user of self-contained breathing apparatus. The demand regulator generally functions by inhalation creating movement of a diaphragm, which in turn operates a valve that is linked to it. Upon the demand regulator valve opening, the first stage or high pressure regulator then regulates flow from the source, such as a high pressure tank.

This invention is concerned with regulation of the high pressure source to a second stage or demand regulator. Such regulators are known to have a diaphragm that is exposed to ambient pressure. Such regulators are utilized with self-contained breathing apparatus used for industrial or firemen's safety equipment, as well as self-contained underwater breathing apparatus. Oftentimes, the high pressure regulator is attached to a valve of a tank by means of a yoke and a threaded securement by the yoke. The high pressure source is allowed to flow into the regulator and after regulation to the intermediate or demand regulator.

Such regulators that are used for high pressure have in the past had problems with regard to the high pressure seat. As can be imagined, high pressure against a movable valve seat can cause valve deterioration. In the case of valve seats which utilize a softened material, such as an elastomer or plastic for sealing purposes, the wear and the problems associated with valve movement can be quite severe.

Valves that employ high pressure seats in the past have often had an elastomer molded into the valve seat. The elastomer is exposed to high pressure and can deteriorate over time due to its movement against a sharpened crown or sealing orifice. A further problem associated with such high pressure seats is the elastomer can disassociate from the metal to which it is adhered or seated.

The delamination or disassociation of an elastomeric or plastic seating portion from its metal underlayment or seat body can be quite severe. The results are that when a disassociation takes place, the valve will no longer function in its normally operative mode. When it does not function, it can impede or supply excess air to a user, such as one using self-contained breathing apparatus for industrial or firemen's safety in hazardous environments or in the alternative, self-contained underwater breathing apparatus.

This invention overcomes the deficiency of such seats in the prior art by creating a seat without any elastomeric or plastic to metal junctions exposed to high pressure. Prior art seat junctions exposed to high pressure sometimes separated. To the contrary, this seat provides for a smooth, unrestricted surface which is exposed to high pressure breathing gas without any junctions or partlines. This serves to prevent disassociation or delamination of soft elastomeric or plastic portions from the metal of the seat body to which it is adhered. Consequently, greater reliability as to delamination and disassociation is accomplished by this invention. This enhances the longevity and overall operability and reliability of the first stage regulator in which this invention is utilized.

SUMMARY OF THE INVENTION

This invention comprises a high pressure valve seat formed of a plastic or elastomeric material in connected relationship to a metal seat member or body. The elastomeric or plastic material is molded on the metal in such a manner as to prevent any junctions or partlines being exposed to the high pressure which is to be valved.

In a more specific manner, the valve seat material comprises a plastic or elastomeric material that is molded over a brass seat member. The elastomeric or plastic material is molded so that it is not exposed to the high pressure at a junction point between the metal and the plastic. Avoidance of the junction or parting line between the metal and the plastic causes the plastic to be exposed to high pressure without any part lines or junctions which can separate. This in turn prevents delamination and failure of the seat member comprising the metal seat body and the plastic sealing material which seals in conjunction with the crown or orifice opening.

The plastic adhered to the seat body is of a particular material so as to allow sealing, while at the same time providing for movement against an O Ring. The particular hardness of plastic in the range provided by this invention allows for movement against a sealing O Ring while at the same time sealing against the crown. The net result is a highly efficient, safe and usable regulator having a seat which has significantly greater longevity, operability and reliability than that of the prior art.

Attendant with the longevity of the seat are improved regulator functions wherein the springs and operative elements of the regulator can function more smoothly and effectively. Consequently, it is believed that this invention is a step over the prior art with respect to high pressure or first stage regulators, and in particular high pressure seats thereof.

BRIEF DESCRIPTION OF THE DRAWINGS

FIG. 1 shows a midline sectional view of a typical first stage regulator embodying this invention.

FIG. 2 shows a sectional detailed view of the high pressure seat with its associated spring biasing elements, which forms the prior art.

FIG. 3 shows a perspective view of a prior art seat body with an elastomeric seat as shown in FIG. 2 of the prior art.

DETAILED DESCRIPTION OF THE PREFERRED EMBODIMENTS

Figure 4:
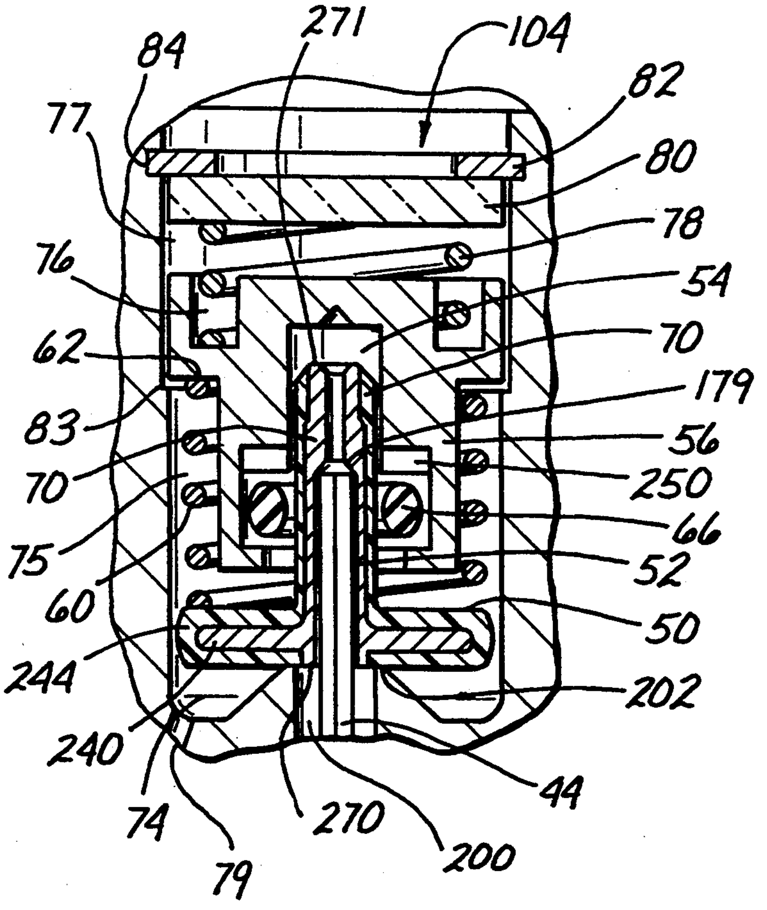
FIG. 4 shows the improved high pressure seat of this invention as sectioned and detailed within the regulator seen in FIG. 1.

Looking more specifically at the figures in the entirety and in particular FIG. 1 which shall be described herein for background, it can be seen that there is a regulator body 10 that is shown. The regulator body 10 can be made of various materials such as brass, stainless steel or other materials which are easily formed or machined.

The regulator body 10 receives a membrane or diaphragm 12. The membrane or diaphragm 12 is made of an elastomeric rubber formed with two layers of rubber over fabric. The diaphragm 12 can be made of any other suitable material so long as it provides diaphragmatic flexibility in association with the other portions of the regulator.

A thrust washer 14 is utilized to prevent the membrane or diaphragm 12 from being damaged during assembly. The thrust washer 14 can be formed of any suitable material and configuration of any washer conformation to provide for protection of the diaphragm 12. A spring 16 is utilized to provide for regulation and control in the manner well known in the prior art. The spring 16 is seated against the diaphragm by means of a pad or spring support 18. The pad or spring support 18 receives the spring thereagainst by seating it around an upstanding portion 20.

In order to retain the spring 16 in seated relationship with the valve body 10, a spring retainer or cap 24 is utilized. The spring retainer or cap 24 is threaded into the valve body at threads 26 interfacing the valve body and the spring retainer 24.

Adjustment is provided to the spring 16 by means of an adjusting screw 28. The adjusting screw 28 is seated within the spring retainer or cap 24 by means of being threaded into threads 30 therein. An exposed notch can receive a screwdriver or other adjustment tool to allow it to turn within the threads 30 and provide for increased or decreased pressure on the spring 16.

In order to transmit pressure from the diaphragm 12 to the valve, a pin support 38 made of brass or other suitable material is seated against the diaphragm 12. The pin support has an upstanding portion 40. The upstanding portion has an opening 42 therein which receives a pin 44. The pin 44 travels upwardly and downwardly within a passage or cavity 46 which is in the regulated intermediate pressure zone. The travel upwardly and downwardly in passage 46 allows for engagement of the pin against a high pressure seat 50 which comprises the invention hereof. The high pressure seat 50 is formed of an elastomeric material and a seat body as will be detailed hereinafter.

The high pressure seat 50 has a passage 52 passing therethrough. The passage 52 allows for the flow of gas into a space 54.

The space 54 is formed within a spring block 56. The spring block 56 receives a spring 60 surrounding the spring block. The spring block 56 is formed with a shoulder 62 which receives the spring 60 at one end while the other end of the spring engages the high pressure seat 50. This allows the high pressure seat 50 to move upwardly and downwardly against the spring 60 so that pressure can be regulated.

The spring block 56 with the opening or cavity 54 therein is sealed by means of an O Ring 66. The O Ring 66 is formed in surrounding relationship to an upstanding portion of the high pressure seat valve body, namely upstanding portion 70. In this manner, it seals the area around the upstanding portion 70 such that flow from the high pressure side in area or cavity 74 surrounding the spring block 56 cannot flow into the space or cavity 54. The space or cavity 54 is fundamentally at the intermediate pressure. To provide for movement of the upstanding portion 70 against the O Ring 66, a light lubricant can be utilized.

In order to hold the spring block 56 in position it is provided with a circular recess 76. The circular recess 76 receives a spring 78 which is used to hold the spring block 56 in place. At the other end, the spring 78 is seated against a filter 80. The filter can be made of a sintered metal. The filter 80 is held in place by means of a C clip 82. The C clip 82 can be substituted by any means for expanding into a notch 84 to hold the filter 80 in place by the spring 78 which pushes up against it while it is pushing down against the spring block 56. The spring block is checked from movement by engaging a shoulder 83 of the valve body 10.

In order to receive a flow of gas, the regulator is secured to a high pressure tank by means of a yoke 90. The yoke 90 has a yoke screw 92 connected to a threaded shaft 94. The yoke screw 92 is formed with a knob 96 secured to the rotatable shaft 94 threaded by threads 98 into the yoke 90. This allows for a pointed end 100 to be threaded against a tank valve outlet for driving it against the surface 102 to provide for the flow of high pressure gas in the direction of arrow 104 into the regulator opening.

The flow of high pressure gas in the direction of arrow 104 flows into the high pressure side of the regulator which can be defined in the area surrounding the spring block 56 such as passage cavity or space 74, space 75 and overlying area 77 surrounding the spring block. A further high pressure passage 79 is seen passing to a high pressure port which has been sealed by means of a plug 81. The plug 81 allows for access to the high pressure so that a determination can be made by means of a gauge as to the high pressure remaining in a tank of gas, such as a tank used for self-contained underwater breathing apparatus.

The low, lower, or intermediate pressure (used interchangeably) that has been regulated is seen within the opening 46 which leads from cavity 47 having an outlet 49 which is connected to the second stage or demand regulator. Lower or intermediate pressure is also seen within the space 54 in the spring block above the high pressure seat 50 upright portion 70. Additionally, intermediate pressure is seen in the area surrounding the diaphragm 12 at the pin support 38. This can be seen with respect to space 120.

The intermediate or lower regulated pressure can be sensed or utilized from the cavity 47 by unthreading a cap or plug 59. In this manner, intermediate pressure can be used to fill a buoyancy compensator or provide for other uses such as another demand regulator connected thereto for an emergency.

In operation, when a decreased pressure is sensed at opening 49 by a user inhaling, thereby creating demand for breathing gas, the first stage regulator then functions. It functions by virtue of intermediate pressure decreasing in the intermediate pressure zone such as within cavity 120 so that the diaphragm 12 then flexes inwardly. This attendantly allows the pin support 38 to move the pin 44. As the pin 44 is moved, it lifts upwardly at its interface 179 with the interior body of the high pressure valve seat 50. As it moves upwardly against the interior of the valve seat body it causes the valve seat of the high pressure seat 50 to lift upwardly. Upon lifting upwardly against the pressure of spring 60, it exposes an orifice 200. The orifice 200 is in connected relationship to the intermediate pressure area 46 and allows the flow of gas over the edges 202 or crown surrounding the orifice 200.

Looking at FIGS. 2 and 3 more specifically, it can be seen that the prior art high pressure seat 206 has been shown. This prior art high pressure seat 206 incorporates a brass seat body 208 having a stem portion 210 with a shoulder 179 equivalent to the shoulder shown in FIG. 4 against which the pin 44 is seated.

The prior art high pressure valve body 208 incorporates an enlarged flattened end 210 which has flattened side portions 212. Within the flat end 210, a groove or circular space 214 was provided. The space 214 receives a compression molded rubber elastomeric material 215. The compression molded rubber is adhered to the metal of the high pressure valve body by means of an adhesive. Nevertheless, regardless of the adhesive and type of elastomer or plastic that was utilized, an interfacing area or transition was maintained at an interface 218 or partline.

Figure 5:
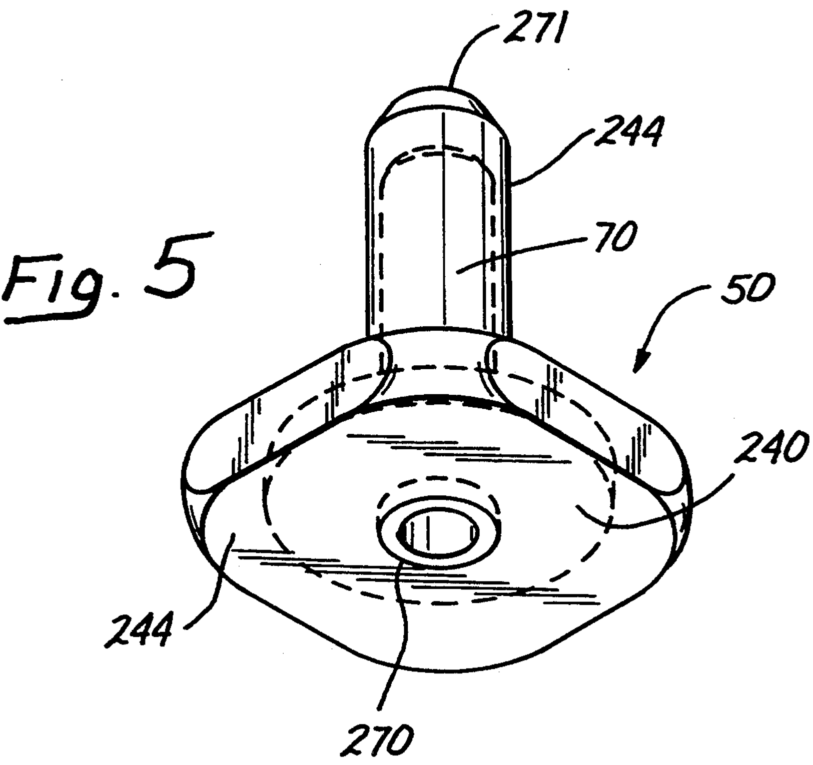
FIG. 5 shows a perspective view of the high pressure seat of this invention shown in FIGS. 1 and 4.

The inventor hereof has invented a unique seal by preventing any transition between the sealing media and the high pressure seat body. Looking at FIGS. 4 and 5, it can be seen that the high pressure seat 50 is shown with an upright or stem portion 70 and a flattened interior portion 240. These form the metal seat body upon which plastic is molded upon. The flattened interior seat body portion or flat 240 receives a molded material around it and the upright portion 70. The molded material can be in the form of a product known generally as a thermoplastic resin in the form of polyether block amides. It is comprised of regular and linear chains of rigid polyamide sold in part under the trademark nylon and flexible polyether blocks.

The chemical formulation allows for a sufficiently resilient material that is not overly soft yet at the same time provides a seal against the crown 202. It has been found that material in the form of the plastic resin, namely plastic resin 244, which is formed around the flattened portion 240 of the high pressure seat body, as well as the stem 70, should be relatively hard but not so hard as to prevent a resilient seal against the crown 202. This is because of the fact that the plastic resin 244 surrounding the upright stem 70 of the high pressure seat 50 must pass through the O Ring 66. If it is not sufficiently hard, it will bind and adhere against the O Ring 66 thereby causing it to wear and in extreme cases be extruded into the space 54. In order to prevent the high pressure of cavity 74 from extruding the O Ring 66 into the space 54, a teflon O Ring known as a parback 250 is utilized.

Of greater significance is the fact that the flattened end 240 with the plastic 244 surrounding it does not provide a transition or junction exposed to the high pressure of the cavity 74. The plastic or polymer extends over the crown 202 and into the space 200 so that the only junction points or termination points are seen at interface 270 between the flattened end of the high pressure body and the polymer 244, and at the end of the stem at point 271 within cavity 54. At these partlines or junction points 270 and 271, intermediate pressure has been provided. The pressure is not of such a magnitude as to drive the plastic 244 away from the flattened end 240 so as to cause delamination and failure. Also, where the stem 70 interfaces with the plastic at point 271, low or intermediate pressure is seen due to the pressure in cavity 54.

Various types of polymers and plastics can be utilized in order to surround the seat body metal of the high pressure seat 50. However, it has been found that the foregoing polymer within a shore D range of between 58 and 68 will generally satisfy the usage by virtue of the fact that it will not bind against the O Ring 66 yet at the same time provide a seal against the crown 202. Other ranges can be used as well as shore ranges from 45 to 85. However, in such cases modification of the O Ring 66 must be undertaken and redesigned and characteristics of the crown 202 must be considered.

From the foregoing it can be seen that a high pressure seat body having a sufficiently resilient plastic seat against the crown 202 has been provided by this invention without the transition and danger of delamination and failure by disassociation from the metal underlayment that forms the high pressure seat body. Consequently it is believed this invention is a step over the art and should be recognized in the form of the following claims.

I claim:

1. A regulator for self-contained breathing apparatus comprising:

a regulator body;

means for connecting said regulator body to a source of high pressure gas;

an opening in said regulator body for receipt of high pressure gas;

a diaphragm in said regulator body;

spring biasing means adapted for biasing said diaphragm;

an intermediate pressure zone in said regulator body;

an orifice in said regulator body for connection to said source of high pressure gas providing a passage to said intermediate pressure zone which is on the other side of said orifice;

a valve body for overlying said orifice;

said valve body formed with an enlarged portion adapted for overlying said orifice;

means for spring biasing said valve body against said orifice;

means for connecting said diaphragm to said valve body;

a plastic overlying said valve body extending into the zone of intermediate pressure within said orifice;

a spring block having a cavity overlying said valve body;

a spring between said spring block and said valve body for biasing said valve body against said orifice;

an upright portion of said valve body extending upwardly into the cavity of said spring block;

sealing means for surrounding said upright portion from high pressure gas; and, said plastic surrounding said enlarged portion overlying said orifice is formed around said upright portion into a zone sealed from said high pressure gas.

2. The regulator as claimed in claim 1 wherein:

said enlarged portion and upright portion comprise an inverted T in cross section having a plastic surrounding said inverted T into said intermediate pressure zone.

3. The regulator as claimed in claim 1 wherein:

said orifice is surrounded by a crown for seating against the plastic of said valve body.

4. The regulator as claimed in claim 3 wherein:

said plastic is of an elastomer formed of polyether amides.

5. The regulator as claimed in claim 1 wherein:

said plastic overlying said valve body is of a shore D range of between 45 to 80.

6. The regulator as claimed in claim 5 wherein:

said shore D range of said plastic is between 58 and 68.

7. The regulator as claimed in claim 1 wherein:

said plastic overlying said valve body does not have a junction between it and said valve body exposed to said high pressure gas.

8. A regulator for self-contained breathing apparatus comprising:

a regulator body;

means for connecting said regulator body to a source of high pressure gas;

an opening in said regulator body for receipt of high pressure gas;

a diaphragm in said regulator body which is exposed to ambient pressure on one side and gas pressure which has been regulated by said regulator on the other side;

spring biasing means for biasing said diaphragm;

a valve body made of metal;

an orifice in said regulator body for connection to said source of high pressure gas for regulating said high pressure gas to an intermediate pressure zone on the other side of said orifice;

means for spring biasing said valve body against said orifice so that it extends over said orifice;

an elongated rod interconnecting said diaphragm to said valve body;

a plastic overlying said valve body extending at least in part across said intermediate pressure zone; and, a crown surrounding said orifice having an edge region which engages said plastic overlying said valve body such that the crown edges extend against said plastic at a point sufficiently removed to allow for the plastic interface between the plastic and the valve body to be across the intermediate pressure zone of said orifice.

9. The regulator as claimed in claim 8 further comprising:

said valve body formed with an enlarged portion adapted for overlying said orifice and having an upright portion having a cavity into which said rod can extend;

sealing means for surrounding said upright portion from high pressure gas; and, a plastic continuously surrounding said enlarged portion overlying said orifice and around said upright portion into a zone sealed from said high pressure so that said intermediate pressure is only at the juncture between said valve body and said plastic.

10. The regulator as claimed in claim 9 wherein:

said plastic is of an elastomer formed of polyetheramides.

11. The regulator as claimed in claim 10 wherein:

said plastic is of a shore D range of between 45 to 80.

12. A first stage self contained breathing apparatus regulator adapted for connection to a source of high pressure gas comprising:

an orifice having a crown surrounding it connected to an intermediate pressure zone;

a diaphragm for sensing pressure changes;

a valve seat formed from a metal valve seat body for purposes of overlying said orifice, said metal valve seat body formed with an extending stem generally forming the upright of a T, said valve seat body adapted for overlying said orifice for regulating gas from a high pressure source through said orifice, said valve seat body having a spring on one side thereof and the receipt of a pin serving as said connection means between said diaphragm and said valve seat body;

a connection means between said diaphragm and said valve seat body to cause said valve seat body to move in response to pressure changes sensed by said diaphragm;

a plastic material molded to said metal valve seat body over said stem and at least to a juncture point beyond said crown which is exposed to intermediate pressure which has been regulated by said regulator;

a spring block overlying the upright portion of said T having a cavity therein which is sealed from the source of high pressure; and, a sealant from said high pressure formed as an O ring surrounding the upright portion of said T within said spring block.

13. The improved regulator as claimed in claim 12 wherein:

said plastic is formed from a thermoplastic resin of polyether block amides.

* * * * *